United States Patent [19]
Dozor

[11] Patent Number: 5,449,986
[45] Date of Patent: Sep. 12, 1995

[54] LINEARIZING DECOUPLING CONTROLLER FOR ELECTRIC MOTORS

[76] Inventor: David M. Dozor, 125 Gallagher Rd., Apt. 7, Wayne, Pa. 19087

[21] Appl. No.: 230,739

[22] Filed: Apr. 21, 1994

[51] Int. Cl.⁶ .................................................. H02P 5/06
[52] U.S. Cl. ................................... 318/254; 318/432; 318/721; 318/724
[58] Field of Search ............... 318/254, 138, 439, 432, 318/434, 700–701, 705, 720–724

[56] References Cited

U.S. PATENT DOCUMENTS

| | | | |
|---|---|---|---|
| 4,447,771 | 5/1984 | Whited | 318/254 X |
| 4,490,661 | 12/1984 | Brown et al. | 318/254 X |
| 4,546,293 | 10/1985 | Peterson et al. | 318/254 |
| 4,608,527 | 8/1986 | Glennon et al. | 318/685 |
| 4,651,068 | 3/1987 | Meshkat-Razavi | 318/254 |
| 4,761,598 | 8/1988 | Lovrenich | 318/254 X |
| 4,814,677 | 3/1989 | Plunkett | 318/254 X |
| 4,835,448 | 5/1989 | Dishner et al. | 318/254 |
| 4,884,016 | 11/1989 | Aiello | 318/685 |
| 4,928,043 | 5/1990 | Plunkett | 318/254 X |
| 4,942,344 | 7/1990 | Devitt et al. | 318/254 |
| 5,006,774 | 4/1991 | Rees | 318/721 |
| 5,059,878 | 10/1991 | Bardelang et al. | 318/490 |
| 5,113,125 | 5/1992 | Stacey | 318/254 X |
| 5,154,242 | 10/1992 | Soshin et al. | 473/178 |
| 5,229,693 | 7/1993 | Futami et al. | 318/254 |

*Primary Examiner*—David S. Martin
*Attorney, Agent, or Firm*—Eugene E. Renz, Jr.

[57] ABSTRACT

An electric motor having optimum torque, comprising a motor having a shaft, a rotor and stator, permanent magnets generating flux and current in windings generating additional flux. A control circuit generates a velocity signal proportional to shaft velocity and a current signal proportional to the current in the windings. The current signal is multiplied by the velocity signal to produce an input signal. The input signal is fed to the motor to thereby adjust the phase angle of the current so that the angle between the flux from the current and the flux from the permanent magnet are 90° apart.

6 Claims, 7 Drawing Sheets

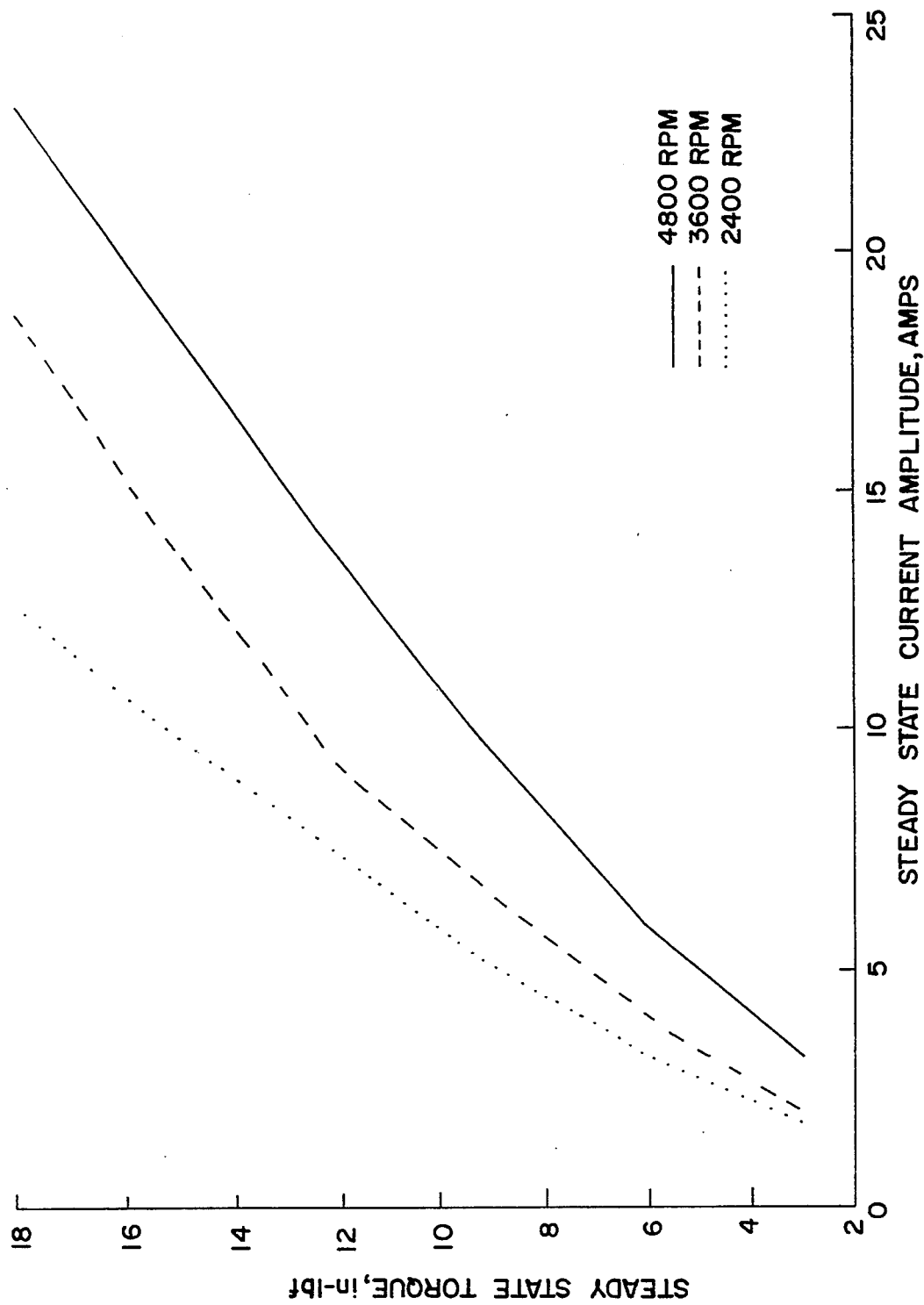

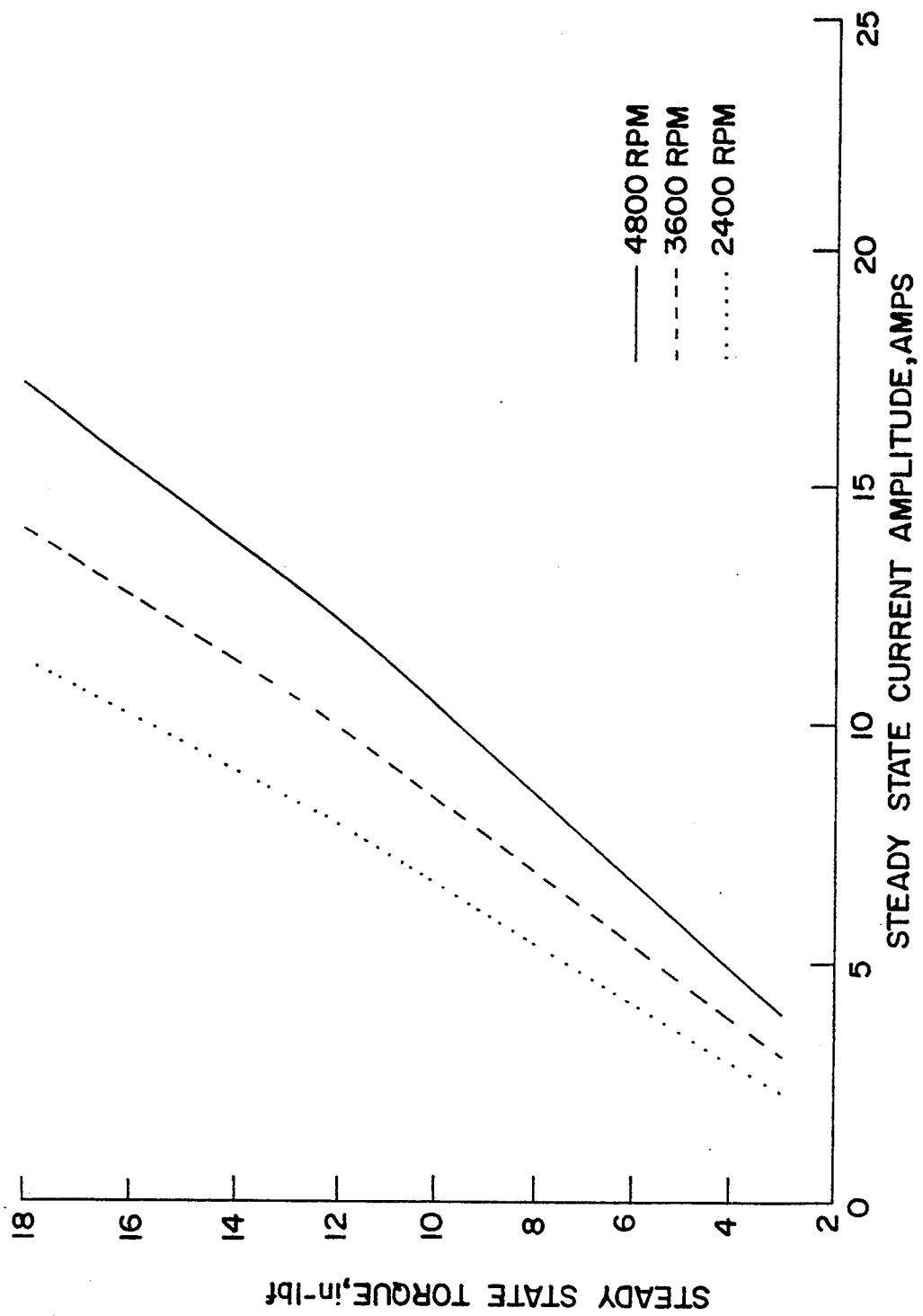

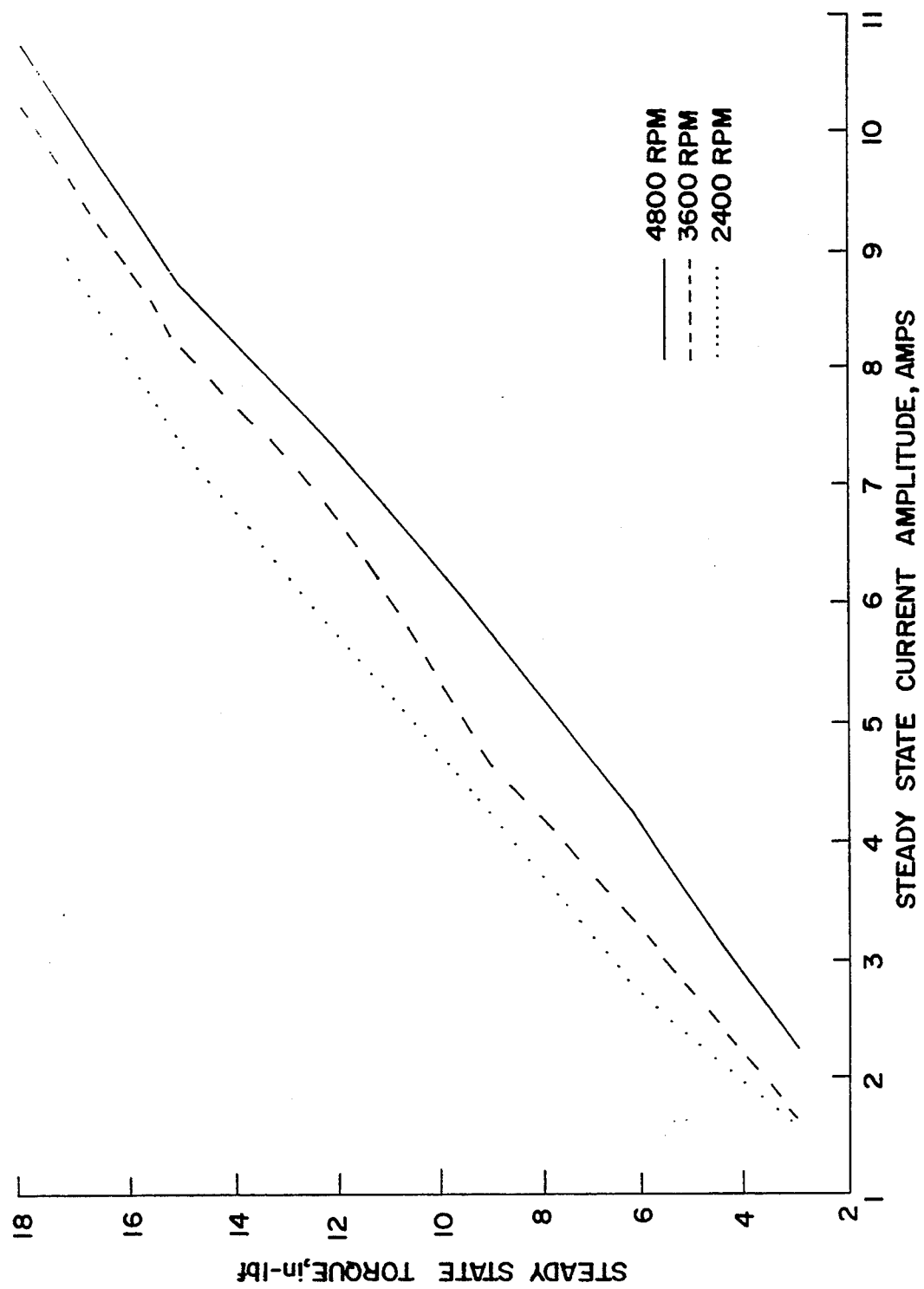

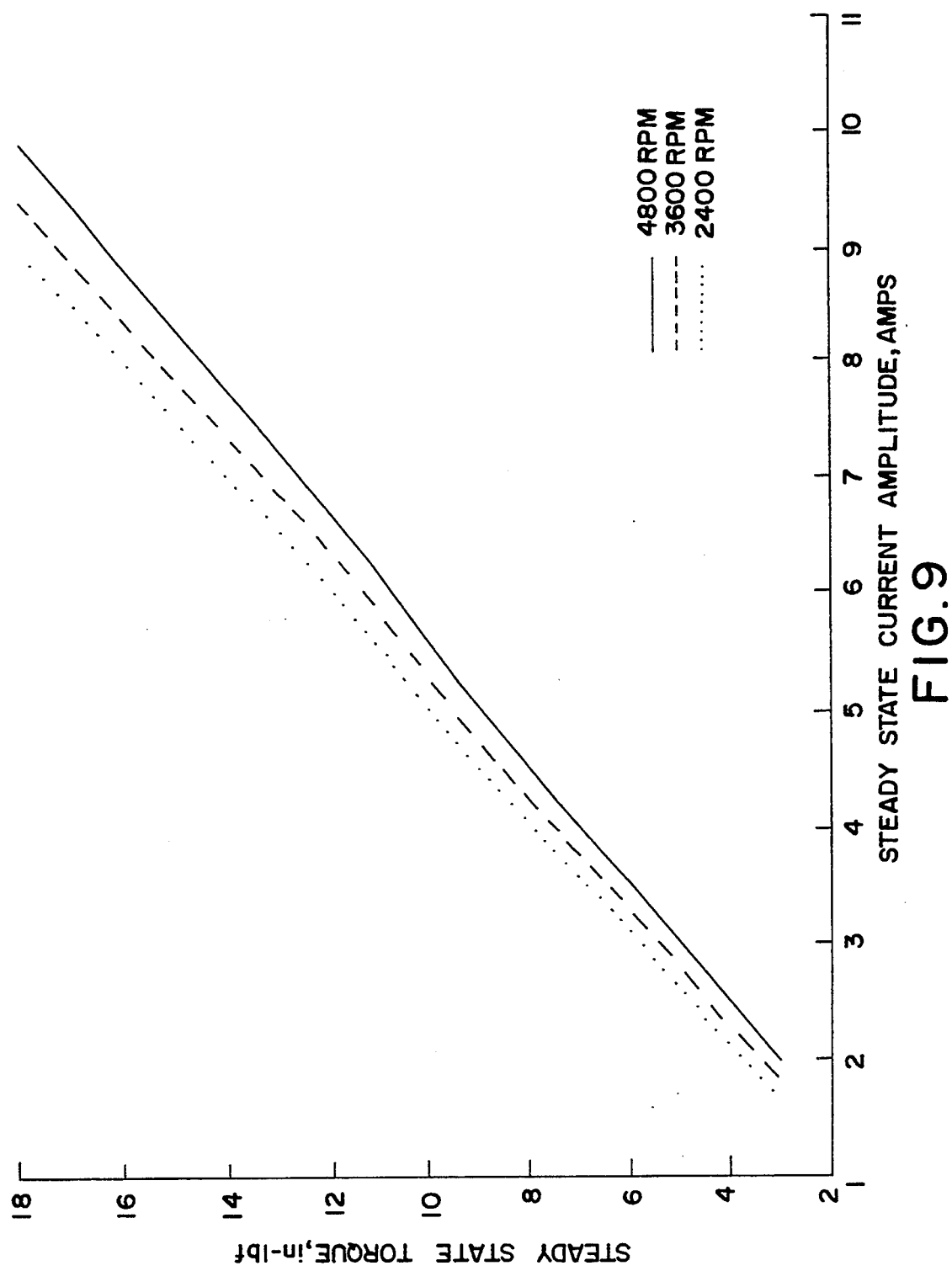

LINEARIZING DECOUPLING CONTROLLER FOR ELECTRIC MOTORS

FIELD OF THE INVENTION

The present invention relates to electric motors and more particularly to permanent magnet synchronous machines and other three phase electric motors. More specifically, the invention relates to such motors with a control circuit that provides a decrease in power consumption and an increase in torque production by the motor.

BACKGROUND OF THE INVENTION

The permanent magnet synchronous motor (PMSM) is becoming widely accepted as one of the most viable choices in electric motor motion control. Due to the advent of rare earth and ceramic magnets, large torque to inertia ratios may be achieved with this design. In addition, coupled with this attractive feature is the absence of a need for mechanical commutation by slip rings, brushes and the like, due to the development of the resolver to digital converter and other power semiconductor technologies. These developments allow the motor to be optimal in the sense that the best features of the separately excited direct current motor and the synchronous motor are present in this relatively new design. These motors are sometimes collectively referred to as brushless direct current motors with sinusoidal back EMF or surface permanent magnet synchronous motors.

Whited U.S. Pat. No. 4,447,771 describes a control system for synchronous brushless motors in which the motor windings are energized by sinusoidal excitation currents synthesized from pre-recorded sine values. An excitation current is generated in response to the position of the rotor relative to the stator windings in an attempt to create a rotating magnetic field synchronous with the rotation of the rotor. Control is achieved by comparing actual speed to desired speed and generating a signal.

In the above described control system, however, torque angle is controllable merely as a function of two (2) parameters, i.e., the rotor position with respect to the stator and the desired speed. Torque angle does not vary as a function of load and this causes the motor to operate at less than its most efficient operating point. Brown, et. al., U.S. Pat. No. 4,490,661 provides control of the angle between the rotating field created by permanent magnets and the rotating field created by the stator windings. The relationships between these two magnetic fields is controlled as a function of load and speed to provide what is suggested to be an optimum operating point at all times. A solution to this problem involves the use of sinusoidal excitations. Specifically, the sine waves are synthesized incrementally according to rotor position and thus the frequency of the excitation current is synchronous with the motor rotation. The phase of the excitation is a function of rotor position with respect to the stator. The method of control is a complicated method using a memory bank of torque angle factors with values created from pre-recorded digital sine values. Brown, et. al. does not provide for a simple solution to a difficult problem.

Peterson, et. al., U.S. Pat. No. 4,546,293 discloses the use of phase advance pulse width modulated current signals. A phase advanced circuit is coupled to receive a pulse wave-form signal for the motor rotor speed detecting unit and phase advance the pulse wave-form signal as a pre-determined function of motor speed to thereby cause the fundamental current wave form to be advanced. This compensates for fundamental current waveform lag due to motor winding reactance which allows the motor to operate at higher speeds than the motor is rated while providing optimal torque and therefore increased efficiency.

Glennon, et. al., U.S. Pat. No. 4,608,527 discloses a motor winding transformer circuit coupled to motor windings to provide an output signal representative of the magnitude and direction of the real current present in the windings. At the same time, a rotor speed position sensing circuit provides an output signal representative of the motor speed and direction. A load is coupled to the motor to be positioned by the motor in response to a load position command signal such that the load control is efficiently accomplished by the detection of a real current error signal which causes a phase advanced motor voltage waveform from the motor power supplied to achieve the desired load control.

Meshkat-Razavi U.S. Pat. No. 4,651,068 advances the phase of the control signal in a nonlinear manner, based in part at least on the phase lag due to inductance of the motor at high commutation frequencies corresponding to high motor velocities. This patent attempts to compensate for the command signal shape and phase to provide a relatively sinusoidal drive current and torque distribution over the entire operating frequency and torque loads. This is accomplished by amplitude compensation to control current in the windings. A microprocessor is disclosed for accomplishing the control described in this patent.

Lovernich U.S. Pat. No. 4,761,598 measures and adjusts the torque angle between the rotating magnetic field and the actual position of the rotor. This invention contemplates the maintenance of standard current at substantially constant values so that rotor torque and motion are controlled by monitoring and controlling the torque angle.

Dishner, et al. U.S. Pat. No. 4,835,448 employs a control system in which a run circuit compares a periodic signal representing motor speed at a maximum desired phase advance to a phase advance command signal to develop switching signals.

Aiello U.S. Pat. No. 4,884,016 addresses the problems of "six step" control to provide current command signals to a power amplifier that are converted into analog signals from the output of a read-only memory device that has been programmed with multiple sets of sinusoidal data.

Devitt, et al., U.S. Pat. No. 4,942,344 also relates to torque angle shifting for brushless DC motors using electronic commutations. Devitt, et al. provides a control method for eliminating the amount of torque angle shift to the minimum necessary in brushless motors. Means are provided for continuously comparing instantaneous parameter values with values corresponding to full utilization of a motor's supply voltage, and means responsive to that comparison for continuously transmitting a signal to a torque angle shift implementation means to thereby shift a torque angle closer to full utilization of the voltage supply.

Other related patents are Rees U.S. Pat. No. 5,006,774; Bardelang, et. al., U.S. Pat. No. 5,059,878; Stacey U.S. Pat. No. 5,113,125; and Toshihiko U.S. Pat. No. 5,229,693. All of these Patents provide additional control circuits or suggested methods for improving permanent magnet synchronous machines.

The difficulty with all of the aforementioned references is that the proposed control schemes are complicated and require transformation, on-line between rotating and stationary frames and the like and in some cases require replacement of existing linear controllers.

Accordingly, it is an object of this invention to provide a control circuit for use with electric motors which provide a substantial decrease in required current per unit of torque to thereby decrease loses via ohmic heating, and thereby extend the operating envelope of the machine.

Other objects will appear hereinafter.

SUMMARY OF THE INVENTION

It has now been discovered that the above and other objects of the present invention may be accomplished in the following manner. Specifically, the invention provides an electric motor having optimum torque. The motor includes a shaft, a rotor and stator, permanent magnets generating flux and current in windings also generating flux. The invention contemplates generating a velocity signal proportional to the measured shaft velocity and generating a current signal proportional to the measured current in the windings. Means are provided to appropriately mix the measured signals. Means are also provided to multiply the current signal by the velocity signal to produce an input signal. Finally, means are provided to feed the input signal to the motor to thereby adjust the phase angle of the current so that the angle between the current and the flux from the permanent magnets are 90° apart.

The invention increases the torque in electric motors and particularly in the self-commutated permanent magnet motors by altering the phase angles of the applied voltage via feedback from the system. As sinusoidal voltage is supplied to the windings the current phase angle will lag the voltage. The voltage normally used has a peak 90° before or after the North or South magnetic pole goes through a respective stator phase of 0°. Ideally, if the current were the voltage, one would get the maximum torque. Accordingly, the intention of the invention is to adjust the motor so that the current produced is 90° away from the flux produced by the permanent magnets.

BRIEF DESCRIPTION OF THE DRAWINGS

These and other objects of the present invention and the various features and details of the operation and construction thereof are hereinafter more fully set forth with reference to the accompanying drawings, where:

FIG. 6 is a graph illustrating the results of open-loop experimental results for current at constant velocity;

FIG. 7 is a graph illustrating theoretical open-loop results for current at constant velocity;

FIG. 8 is a graph illustrating experimental results for the invention for current at constant velocity; and FIG. 9 is a graph illustrating theoretical results for current at constant velocity for the present invention.

DETAILED DESCRIPTION OF THE PREFERRED EMBODIMENT

Figure 1:
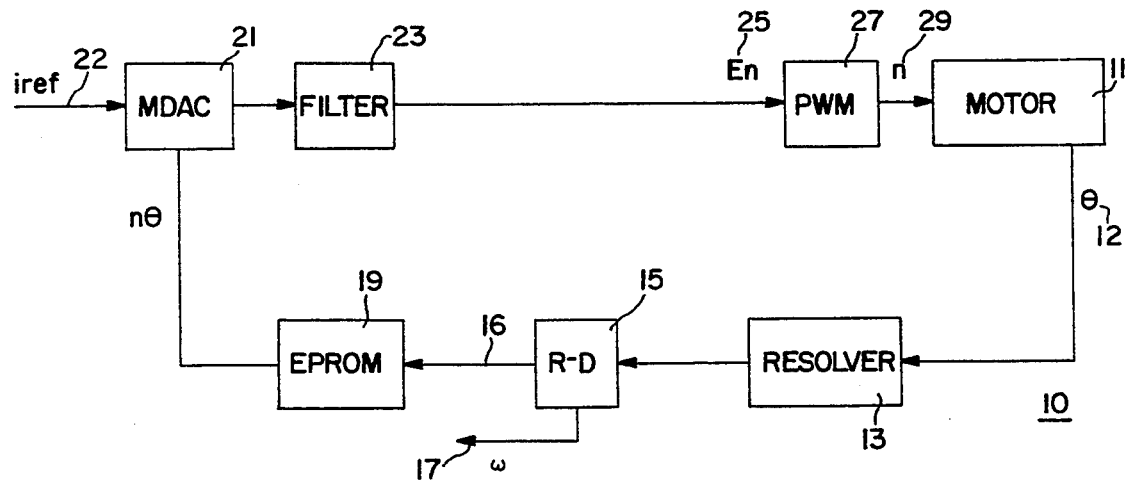
FIG. 1 illustrates an open loop system for a permanent magnet synchronous motor.

The present invention provides an efficiency improving feedback compensator using nonlinear state feedback, both current and speed, to adjust the phase angle of a reference signal of applied voltage to the windings so that the current in the windings is at the optimum phase angle. The system for which the invention is to be employed is shown generally by reference number 10 in FIG. 1. A permanent magnet synchronous motor 11 is to be controlled by this system. In permanent magnet synchronous motors, the rotor magnetic field is generated by the permanent magnet, i.e. electrical power is not used to generate rotor magnetic flux. Therefore, the rotor magnetic flux remains essentially constant at all levels of armature current. It follows then that the speed torque curve of the permanent magnet motor is linear over an extended range for the present invention. The conversion of electrical power to mechanical power takes place through the armature windings.

The rotor angle theta, Θ, shown by reference number 12, indicates the rotor angular position as a resolver 13 receives a signal which is proportional to shaft velocity. Resolver 13 is of the conventional design including a rotor winding and two stator windings in quadrature. The output signals generated by the resolver 13 are converted by a resolver-to-digital converter 15 such as Analog Devices 2s80 R-D converter. A first output 16 of the resolver-to-digital converter 15 is a digital word which indicates the position of the rotor. A second output 17 of the resolver-to-digital converter 15 is an analog signal which indicates the velocity of the rotor.

The first output 16 of the R-D converter 15 is an address for EPROM 19. A phase look-up table is stored with the EPROM 19. The output of EPROM 19 provides voltage angle factors as a function of rotor angle; this output is connected to the input of a multiplying digital-to-analog converter 21. These voltage angle signals are multiplied in the converter 21 by a user supplied reference voltage 22. The user supplied reference voltage 22 provides the voltage command for motor 11. This analog signal passes thorough a filter 23. The output of filter 23 is a sine wave reference signal 25 which is amplified by a pulse width modulated amplifier 27 to produce voltage 29 which is applied to the windings of motor 11. Voltage 29 controls the torque/speed characteristics of motor 11.

The voltage 29 is synchronized with the rotor angular position. While this guarantees stability, it is undesirable due to the fact that some phase lag will be present between the applied voltage and the resulting current (and flux). This phase lag is due to inductance and nonlinear effects. The condition of no lag between the rotor position and the resulting current is optimal for a smooth air gap motor. The system as shown in FIG. 1 does not provide for that optimization.

Figure 2:
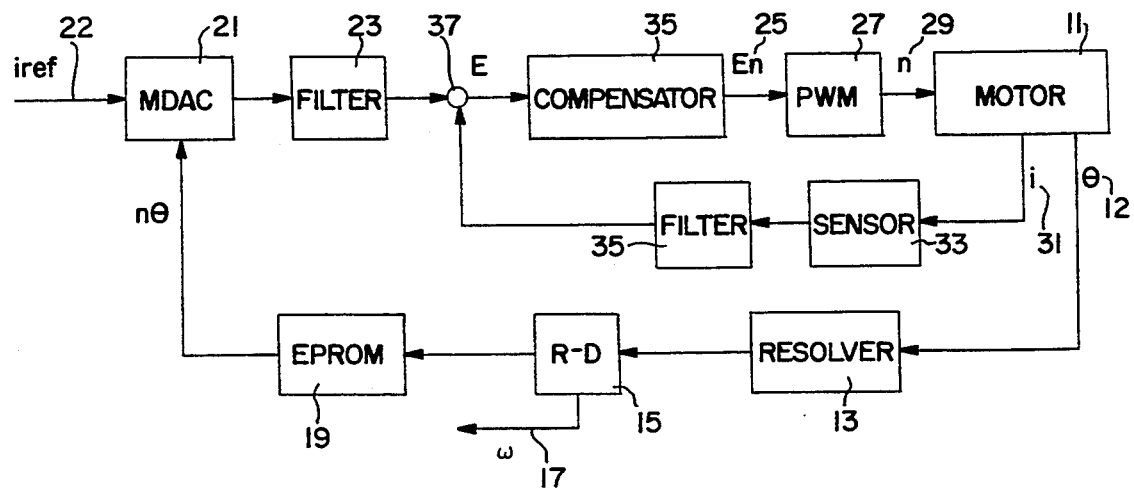
FIG. 2 is an illustration of the prior art method for controlling systems of the type shown in FIG. 1.

As shown in FIG. 2, feedback current control is achieved through the use of a compensator 39. Specifically, current 31 is detected by a sensor 33. The output of sensor 33 is connected to filter 35 which provides a signal that is mixed with the reference signal from filter 23. The outputs of filter 23 and filter 35 are connected to a summing circuit 37. The difference between the two filter outputs, which is referred to as the compensated current error signal 25, is input to a compensator 39. The current error signal 25a controls the amplitude and phase of the motor excitation voltage 29, thereby controlling motor current in accordance with the current command signal 22.

Figure 3:
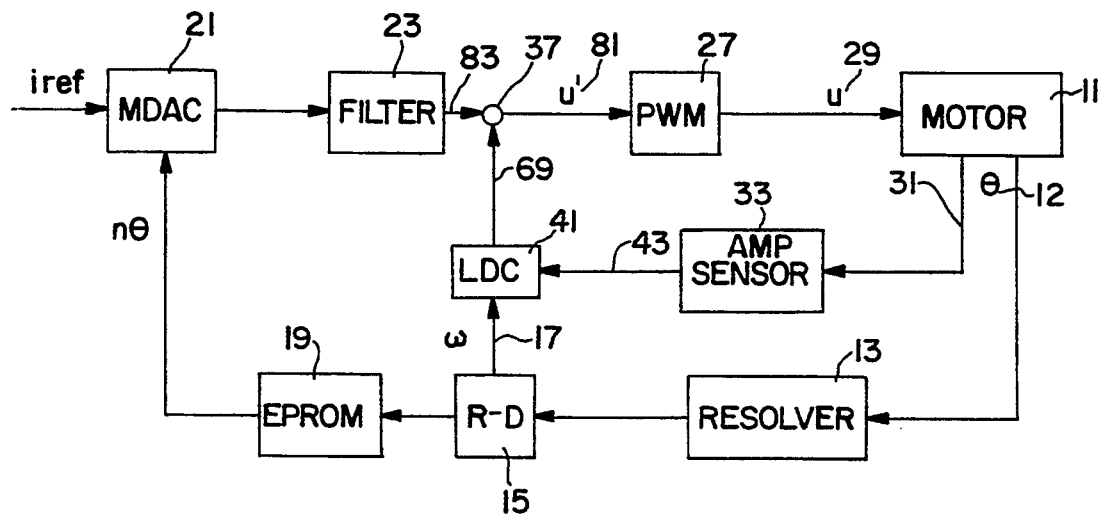
FIG. 3 is a block diagram illustrating the control circuit of the present invention in a system of the type shown in FIG. 1.

By contrast, the present invention, shown in FIG. 3 in schematic form, provides for a linearizing decoupling control (LDC) circuit to substantially improve the torque producing characteristics of three-phase motors; particularly self-commutated permanent magnet synchronous machines.

A drawback associated with permanent magnet motors is that the magnetic field cannot be altered in order to improve power consumption. For this reason, power consumption tends to be greater than necessary under motoring conditions.

In the present invention shown in FIG. 3, the current 31 is measured by sensor 33. Sensor 33 includes Hall effect transducers which are used to detect the phase current. The Hall effect transducers produce 50–8 mV per ampere of current sensed. The output of sensor 33 is input into the linearizing decoupling control circuit 41. A second output 17 of the resolver-to-digital converter 15 is an analog signal which indicates the angular velocity of the rotor. The LDC circuit 41 alters the available sinusoidal signals from the Hall effect transducers with the second output signal 17 of R-D converter 15. In this manner, a correction of the torque angle δ is transparent to the user and is inherently accounted for in the control structure. The output of the LDC circuit 41 is combined with the output of filter 23 in summer circuit 37. The output 81 of summer circuit 37 is then fed to the pulse width modulation amplifier 27. The LDC circuit 41 modifies the reference signals to the pulse width modulator 27 by adding sine waves of appropriate phase and amplitude computed by the LDC 41.

Previous efforts to employ feedback current control schemes treated each phase independently. Due to amplifier effects, a proportional plus integral or a lag compensator is used. Current feedback signals are taken from the Hall effect transducers or other suitable means. These signals are compared with the reference, and the difference is used as an input to the compensator. However, this control scheme does not consider the relative phases of the signals. In fact, the addition of linear dynamics will often result in additional lags, thereby further deteriorating performance. Some phase lag will always be present between the applied voltage and the resulting current. This phase lag is due to inductance and nonlinear effects. The ideal operation of a smooth air gap motor would have no lag between the rotor position and the resulting current. In the present invention shown in FIG. 3, the signals supplied to the pulse width modulator 27 are modified by adding sine waves of appropriate phase and amplitude from the circuit 41 to the existing reference signal coming from filter 23. In circuit 41, the sinusoidal current signals of the invention from independent phases are combined and multiplied by the velocity signal.

The rotating frame model is given below without derivation.

$$\frac{d}{dt}\begin{bmatrix} i_q \\ i_d \\ \omega \end{bmatrix} =$$

$$\begin{bmatrix} -\frac{R}{L_S} & 0 & -\frac{nk_t}{L_S} \\ 0 & -\frac{R}{L_S} & 0 \\ \frac{nk_t}{J} & 0 & -\frac{B}{J} \end{bmatrix} \begin{bmatrix} i_q \\ i_d \\ \omega \end{bmatrix} +$$

$$\begin{bmatrix} -n\omega i_d \\ +n\omega i_q \\ 0 \end{bmatrix} + \begin{bmatrix} \frac{K_{amp}}{L_S} & 0 & 0 \\ 0 & \frac{K_{amp}}{L_S} & 0 \\ 0 & 0 & -\frac{1}{J} \end{bmatrix} \begin{bmatrix} U_q \\ U_d \\ T_l \end{bmatrix}$$

$$k_t = \sqrt{\frac{3}{2}}\, k_e$$

$K_{amp}$ is the gain of the PWM amplifier and $U_q$ and $U_d$ represent the voltage applied at the input to the amplifier.

The transformation from the stationary frame to the rotating frame is a power preserving orthogonal transformation representing pure rotation plus reflection. This transformation used in conjunction with Kirchoff's Law and the assumption of perfectly sinusoidally distributed air gap flux, leads to the following relationship between the stationary and rotating frame quantities;

$$\psi_1 = \sqrt{\frac{2}{3}}\, \sqrt{\psi_q^2 + \psi_d^2}\, \cos\left( n\theta - \tan^{-1}\left(\frac{\psi_d}{\psi_q}\right) \right)$$

Where $\Psi 1$ represents any electrical quantity (voltage, current, flux, etc.).

Inspection of the above equation shows that driving $I^d$, the direct axis current, to zero will decrease the phase lag and therefore the torque angle. Note that $I^d$ is the component of armature current parallel to the permanent magnet flux and produces no torque. Selection of voltages in equation 2 in order to cancel the "NΩI" terms will accomplish this. In a stationary frame, the control law is as follows:

$$U_1 = -\frac{\sqrt{3}\, nL_S}{3\, K_{amp}}\, [i_1 + 2i_2]\omega + V_1$$

$$U_2 = +\frac{\sqrt{3}\, nL_S}{3\, K_{amp}}\, [2i_1 + i_2]\omega + V_2$$

Figure 4:
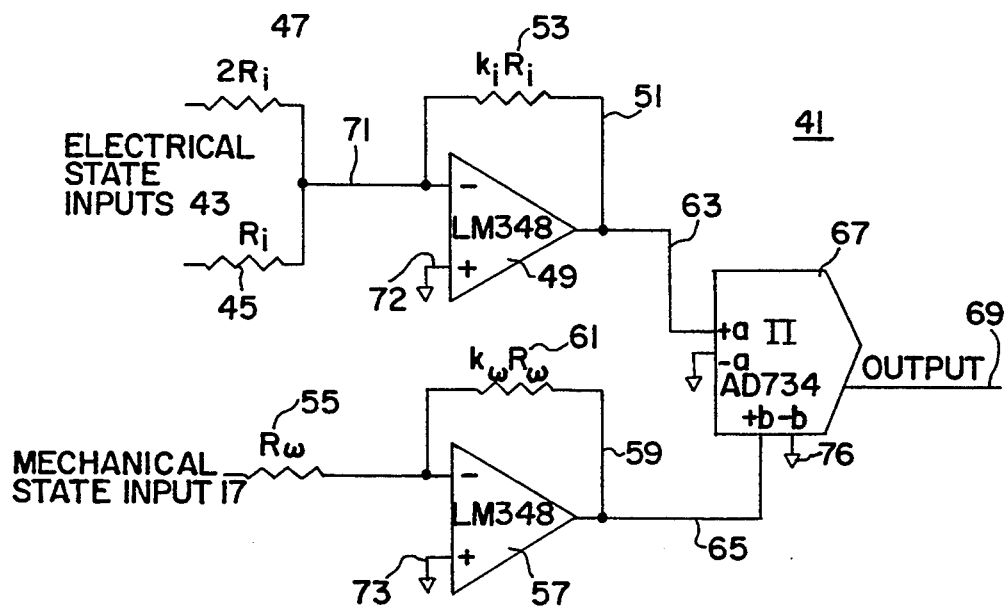
FIG. 4 is a schematic diagram illustrating one phase of the circuit of this invention.

Implementation of this control law shown in FIG. 4.

For a three phase machine, a single phase of the LDC circuit is shown in FIG. 4. The output 43 of sensors 33, which represents the motor currents 31, is input into an inverting summer operational amplifier 49 with gains determined by input resistors 45 and 47, and feedback resistor 53. The resistance of resistor 47 is nominally twice the resistance of resistor 45. The gains on the signals 31 which pass through resistors 45 and 47 are determined by the resistance of the feedback resistor 53.

Using a similar amplifier 57 configuration, the velocity signal output 17 of the R-D converter 15 is also an input into the LDC circuit. An appropriate gain may be selected on the signal 17 through the use of resistors 55 and 61. The nominal gain on the signal 17 at the output 59 of the operational amplifier is k*. The output of both operational amplifiers 49 and 57 are input into a multiplier 67.

Figure 5:
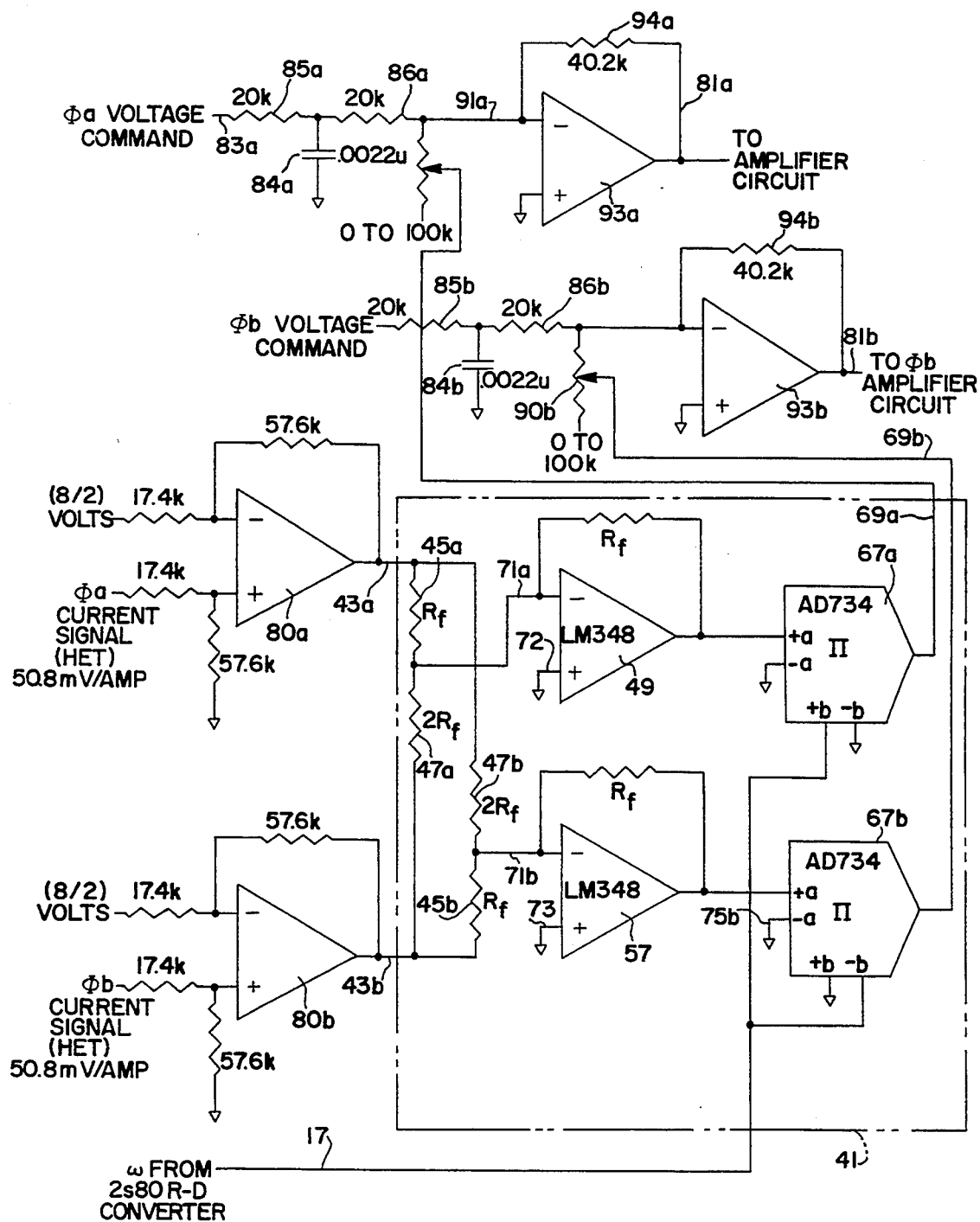
FIG. 5 is a schematic diagram showing the preferred embodiment of the present invention.

Referring now to FIG. 5, the complete LDC circuit is shown. The output of current sensors, such as Hall effect transducers, are amplified in a typical manner. For this example, operational amplifiers 80a and 80b are used. This amplifies the current signal from the Hall effect transducers to levels which are compatible with the rest of the LDC circuitry. The output 43a, 43b of these amplifiers are input into the LDC circuit 41. The inputs 43a and 43b are connected to inverting summer operational amplifiers 49a, 57 through resistors 45a, 47a, 45b, and 47b. The outputs of the inverting amplifier circuits are input into multipliers 67a and 67b. The output 69a, 69b of the multipliers 67a, 67b are added to the voltage command from multiplying digital-to-analog converter 21 after it has been filtered by filter 23. A resistor-capacitor network is used to filter the $\Phi_a$ voltage command at input 83a, 83b. Resistors 85a and 86a in combination with capacitor 84a are used to form the RC filter. The output 69a of the multiplier 67a is connected to a potentiometer 90. In a preferred embodiment, the resistors 85a and 86a are 20 kiliohm and the potentiometer 90a is a 0-100 kiliohm pot. Capacitor 84a is typically a 2.2 picofarad capacitor. The output 91 of the filtering arrangement is then amplified. An inverting amplifier circuit consisting of operational amplifier 93a and feedback resistor 94a and potentiometer 90a is shown. The output 81a of the summer 37, which is also shown as 93a and 93b, is then connected to the pulse width modulator 27.

The circuit of this invention provides a significant improvement over present torque angle controllers, allowing the machine to produce more torque per unit of electrical current. The advantages of the present invention particularly include the surprising simplicity of implementation. Prior art schemes have utilized very complex circuitry to solve the torque angle problem, if at all, in what may be termed an ad hoc manner.

The present invention realizes the full and accurate theoretical solution. This may be seen by the test data shown in FIGS. 6, 7, 8 and 9, which show torque vs. current lines. Using the present invention, in FIGS. 8 and 9, the full specified torque constant is achieved. Without the present invention only a fraction of the specified torque constant is achieved, and this fraction decreases with increasing load and speed.

It should be noted that the instant invention can be used with any polyphase machine. It must be kept in mind that the reference signals are fed to the pulse width modulator amplifier by adding the sine waves of appropriate phase and amplitude to the existing reference signals. The available sinusoidal signals from the current sensors are appropriately combined then altered in amplitude using the velocity signal. In this way, the control of the torque angle is transparent to the user and is inherently accounted for in the control structure.

It should also be noted that the preferred embodiment discloses an analog method of implementing the linearizing decoupling control, one skilled in the art could easily modify this invention for a digital control system. In addition, it would be readily apparent to implement the addition of the sine waves of appropriate phase and amplitude in software. While a resolver is shown in the motor used to explain the various embodiments, the invention also functions as described without a resolver. As such, the invention is not limited to the embodiments herein described, as other embodiments may be varied in both construction and detail.

What is claimed is:

1. An electric motor having improved torque, comprising:
   a motor having a shaft, a rotor and stator, magnets generating flux, current in windings generating additional flux, and amplifier means for providing current to said windings;
   means generating a velocity signal representative of shaft velocity;
   means generating a current signal representative of the current in said windings;
   means multiplying said current signal by said velocity signal to produce an input signal; and
   means feeding said input signal to said amplifier means to thereby adjust the phase angle between the flux from the current and the flux from the magnet.

2. The motor of claim 1 wherein said means generating a current signal includes a Hall effect transducer.

3. The motor of claim 2 wherein said means multiplying said current signal by said velocity signal includes means producing sinusoidal signals multiplied by a signal derived from said Hall effect transducer.

4. A control system for an electric motor including a stator having a plurality of windings, a rotor having plurality of flux generating magnet poles arranged in selective magnetic coupling relation with the windings in order to produce rotation in response to energization of the windings, a reference signal source and a power amplifier supplying a signal to said motor, comprising;
   sensor means for producing a velocity signal representative of the rotor velocity;
   monitoring means for sampling the phase currents in said windings and summing means for producing a current signal representative of said sampled phase currents signal;
   multiplication means for multiplying said current signal and velocity signal; and
   summing means to combine these representative signals with said reference signal for producing at least one control signal to be applied to the input of said power amplifier for effecting the energization of the windings in order to produce flux and adjust the phase angle between said flux and the flux due to said magnet poles in order to produce an optimized torque per ampere operating characteristic.

5. The circuit of claim 4 wherein said means generating a current signal includes a Hall effect transducer.

6. The circuit of claim 5 wherein said means multiplying said current signal by said velocity signal includes means producing sinusoidal signals multiplied by a signal derived from said Hall effect transducer.

* * * * *